United States Patent [19]

Iizuka et al.

[11] Patent Number: 5,200,500
[45] Date of Patent: Apr. 6, 1993

[54] PROCESS FOR THE PREPARATION OF CROSS-LINKED POLYARYLENE SULFIDE

[75] Inventors: Yo Iizuka; Toshio Hosokawa; Yoshinobu Itoh; Shinji Yamamoto; Kazuo Kusida; Takayuki Katto, all of Iwaki, Japan

[73] Assignee: Kureha Kagaku Kogyo Kabushiki Kaisha, Tokyo, Japan

[21] Appl. No.: 569,766

[22] Filed: Aug. 22, 1990

Related U.S. Application Data

[63] Continuation of Ser. No. 352,879, May 17, 1989, abandoned.

[30] Foreign Application Priority Data

May 26, 1988 [JP] Japan ................. 63-129390

[51] Int. Cl.$^5$ .................. C08G 75/14; C08G 79/04
[52] U.S. Cl. ..................... 528/388; 528/381; 525/537
[58] Field of Search .......................... 528/388

[56] References Cited

U.S. PATENT DOCUMENTS

| | | | |
|---|---|---|---|
| 4,116,947 | 9/1978 | Edmonds, Jr. ............... | 528/388 |
| 4,645,826 | 2/1987 | Iizuka et al. ............... | 528/388 |
| 4,659,789 | 4/1987 | Katto et al. ............... | 528/388 |
| 4,699,975 | 10/1987 | Katto et al. ............... | 528/388 |
| 4,785,057 | 11/1988 | Shiik et al. ............... | 528/388 |
| 4,794,164 | 12/1988 | Iwasaki et al. ............... | 528/388 |
| 4,880,901 | 11/1989 | Cleary ................. | 528/388 |

FOREIGN PATENT DOCUMENTS

| | | |
|---|---|---|
| 0166368 | 1/1986 | European Pat. Off. . |
| 226998 | 7/1987 | Japan ................. 528/388 |
| 256757 | 2/1988 | Japan ................. 528/389 |

Primary Examiner—John C. Bleutge
Assistant Examiner—Helen F. Lee
Attorney, Agent, or Firm—Oblon, Spivak, McClelland, Maier & Neustadt

[57] ABSTRACT

The present invention discloses a process for producing a granular polyarylene sulfide which has a high melt viscosity and a high degree of cross-linkage, becomes gel under melting and is easy to handle in the production and the fabrication thereof.

The process disclosed herein comprises (1) a step (A) an initial-stage polymerization step for obtaining a polyarylene sulfide by reacting an alkali metal sulfide, a dihaloaromatic compound and a polyhaloaromatic compound, having three or more halogen substituents in a molecule, in the presence of water in an amount of 0.5 to 2.9 moles per mol of said alkali metal sulfide at a temperature in the range of 180° to 235° C. until the total conversion ratio of said dihalo- and polyhaloaromatic compounds reaches 50 to 98% and the melt viscosity of a polyarylene sulfide obtained at the end of the step becomes 5 to 5,000 poise, measured at 310° C. and a shear rate of 1,200/second; (2) a step (B) a temperature raising step in which while adjusting an amount of water to be 2.5 to 7 moles per mol of fed alkali metal sulfide, a temperature raising condition from the temperature of step (A) to 240° C. is controlled so that the melt viscosity of a polymer obtained at 240° C. reaches 300 to 10,000 poise, measured at 310° C. and a shear rate of 1,200/second and the temperature raising rate between 240° C. and a temperature of the following step (C) is further controlled to be within the range of 10° to 100° C./hour; and (3) a step (C) a second-stage polymerization step for further continuing the reaction at a temperature of 245° to 290° C. until a melt viscosity of the final product reaches not lower than $1 \times 10^5$ poise, measured at 330° C. and a shear rate of 2/second.

The present invention also discloses a granular cross-linked polyarylene sulfide produced by the process described above.

4 Claims, No Drawings

PROCESS FOR THE PREPARATION OF CROSS-LINKED POLYARYLENE SULFIDE

This application is a continuation of application Ser. No. 07/352,879, filed on May 17, 1989, now abandoned.

BACKGROUND OF THE INVENTION

The present invention relates to a process for producing a cross-linked granular polyarylene sulfide by reacting a metal sulfide, a dihaloaromatic compound and a polyhaloaromatic compound in an organic amide solvent, comprising:

(1) an initial-stage polymerization step (A) for preparing a polyarylene sulfide of a low melt viscosity;

(2) a temperature raising step (B); and (3) a second-stage polymerization step (C), wherein the ratio of water to the metal sulfide, the reaction temperature and the temperature increasing rate are regulated according to the necessity. The invention also relates to a cross-linked granular polyarylene sulfide produced by the process.

As a typical method to produce a polyarylene sulfide (hereinafter referred to as "PAS"), for example, polyphenylene sulfide, a process comprising reacting an aromatic compound having at least one halogen substituents, such as a dihaloaromatic compound, and an alkali metal sulfide in an organic amide solvent such as N-methylpyrrolidone is disclosed in U.S. Pat. No. 3,524,835.

Although cross-linked PAS can be produced even with this process, since the obtained polymer is fine powders of not more than 50 μm in an average particle diameter, the recovery, washing and drying of said polymer are not easy and handling of the polymer is troublesome since the polymer prone to scatter during a molding work or to cause blocking in a hopper.

Methods to obtain PAS in a granular form by allowing an appropriate amount of water to exist during or after polymerization step, are disclosed in U.S. Pat. Nos. 3,919,177; 4,645,826 and 4,745,167, European Patents 244,187 and 256,757 and Japanese Patent Application Laid-Open (KOKAI) No. 62-285,922 (1987). However, when it is tried to produce highly cross-linked PAS by reacting a dihaloaromatic compound mixed with a polyhaloaromatic compound, which has more than 2 halogen substituents in a molecule, with an alkali metal sulfide, it is prone to form large masses of agglomerated particles of PAS during polymerization and cause some difficulties in handling.

As a method to obtain granular PAS having relatively high melt viscosity, for instance, several thousands to several ten thousands of poise measured at 310° C. and a shear rate of 1,200/second, U.S. Pat. No. 4,794,164 discloses a two-stage polymerization method in which the second-stage polymerization is conducted at a high temperature in the range of 245° and 290° C., the temperature of last half of the second-stage is lowered to 220° to 250° C. and the temperature is maintained at the level for a predetermined period of time and thereafter continue the polymerization at a temperature and for a period of time determined according to necessity. However, this method also has a possibility to form large masses of agglomerated particles of PAS during polymerization in case of producing such highly cross-linked PAS as the present invention, therefore the commercial production of this type of PAS by this method is not always easy.

Further, U.S. Pat. No. 4,116,947 discloses a method to produce a branched PAS, having low melt flow value sufficient to be molded without any prior curing, by using dihaloaromatic compound(s) and at least one kind of polyhaloaromatic compound having more than two halogen substituents in a molecule, in the presence of a small amount of water. Although the obtained PAS by the method is thought to have enough melt viscosity to be molded, the method is different from the one to produce granular PAS of high melt viscosity of the present invention.

Taking into consideration the above, the present inventors have extensively studied a mechanism to form granular polymer during polymerization, aiming to obtain a high cross-linked PAS having high melt viscosity, which becomes gel under melting, in a form of granules which is easy to handle thereafter.

The present inventors have further promoted the results obtained and attained the present invention.

SUMMARY OF THE INVENTION

An object of the present invention is to provide a process for producing granular PAS having a high melt viscosity and a high degree of cross-linkage and yet being easy to handle during the production and also excellent in handling characteristics at the time of molding.

It is also an object of the present invention to provide a process for producing highly cross-linked granular PAS having a high melt viscosity and becoming a gel under melting.

The process of the present invention comprises (1) an initial-stage polymerization step (A) of reacting an alkali metal sulfide, a dihaloaromatic compound (hereinafter referred to as "DHA") and a polyhaloaromatic compound which has more than two halogen substituents in a molecule (hereinafter referred to as "PHA"), in an organic amide solvent under the presence of water in an amount of 0.5 to 2.9 moles per mol of said alkali metal sulfide, at a temperature in the range of 180° to 235° C. until a total conversion of DHA and PHA reaches 50 to 98% and a melt viscosity of a polyarylene sulfide obtained at the end of the step, ($\eta_1^*$), becomes 5 to 5,000 poise measured at 310° C. and a shear rate of 1,200/second; (2) a temperature raising step (B) in which while adjusting the amount of water to be 2.5 to 7 moles per mol of the fed alkali metal sulfide, a temperature raising condition of the reaction mixture until it reaches to 240° C. is controlled so that the melt viscosity of the prepolymer obtained at 240° C., ($\eta_2^*$), is 300 to 10,000 poise, measured at 310° C. and a shear rate of 1,200/second, and the temperature raising condition between 240° C. and the reaction temperature of the next step (C) is further controlled to be within the range of 10° to 100° C./hour; and (3) a second-stage polymerization step (C) for further reacting the reaction mixture at a temperature in the range of 245° to 290° C. until the melt viscosity of the final polymer, ($\eta_3^*$), becomes $1 \times 10^5$ poise or more as measured at 330° C. and a shear rate of 2/second.

DETAILED DESCRIPTION OF THE INVENTION

The present invention relates to a process to produce a highly cross-linked granular PAS by reacting an alkali metal sulfide, DHA and PHA in an organic amide solvent, comprising:

(A) a step of producing a PAS by performing a reaction of an alkali metal sulfide, DHA and PHA under the presence of water in an amount of 0.5 to 2.9 moles per mol of said alkali metal sulfide at a temperature of not lower than 180° to lower than 235° C. until the total conversion of DHA and PHA reaches 50 to 98% and a melt viscosity of PAS obtained at the end of this step, ($\eta_1^*$), becomes 5 to 5,000 poise measured at 310° C. and a shear rate of 1,200/second;

(B) a temperature raising step in which while adjusting an amount of water to be 2.5 to 7 moles per mol of the fed alkali metal sulfide, a temperature raising condition of the reaction mixture until it reaches 240° C. is controlled so that the melt viscosity of the prepolymer obtained at 240° C., ($\eta_2^*$), is 300 to 10,000 poise, measured at 310° C. and a shear rate of 1,200/second, and the temperature raising condition between 240° C. and the reaction temperature of the following step (C) is further controlled to be within the range of 10° to 100° C./hour; and (C) a second-stage polymerization step for further continuing the reaction at a temperature in the range 245° to 290° C. until a melt viscosity of the final polymer, ($\eta_3^*$), becomes not less than $1 \times 10^5$ poise measured at 330° C. and a shear rate of 2/second.

The present invention will be described more in detail below.

PREPARATION OF CROSS-LINKED PAS

Preparation of cross-linked PAS according to the present invention comprises performing a reaction of an alkali metal sulfide, DHA and PHA under the specified conditions.

ALKALI METAL SULFIDE

The alkali metal sulfides applicable to the present invention include lithium sulfide, sodium sulfide, potassium sulfide, rubidium sulfide, cesium sulfide and mixtures thereof. These alkali metal sulfides can be used in the form of a hydrate, aqueous mixture or anhydride. Among these alkali metal sulfides, sodium sulfide is the most inexpensive one and therefore is preferable for industrial use. Among many forms of sodium sulfide, pentahydrate is preferable since its purity is high.

A small amount of an alkali metal hydroxide may be jointly used for letting it react with and eliminating any influence of alkali metal bisulfide and/or alkali metal thiosulfate which might exist in trace amounts in the alkali metal sulfide.

DIHALOAROMATIC COMPOUNDS

Examples of the dihaloaromatic compounds applicable to the present invention are p-dichlorobenzene, 2,5-dichlorobenzene, p-dibromobenzene, m-dichlorobenzene, 1,4-dichloronaphthalene, 1-methoxy-2,5-dichlorobenzene, 4,4'-dichlorobiphenyl, 4,4'-diboromobiphenyl, 2,4-dichlorobenzoic acid, 2,5-dichlorobenzoic acid, 3,5-dichlorobenzoic acid, 2,4dichloroaniline, 2,5-dichloroaniline, 3,5-dichloroaniline, 4,4'-dichlorodiphenyl ether, 4,4'-dichlorodiphenyl sulfone, 4,4'-dichlorodiphenyl sulfoxide, 4,4'-dichlorodiphenyl ketone, analogous compounds thereof and mixtures thereof. Among them, the compounds having p-dihalobenzene, for example p-dichlorobenzene, as a main constituent, are preferable.

POLYHALOAROMATIC COMPOUNDS

Examples of the polyhaloaromatic compound having three or more halogen substituents in a molecule and being applicable to the present invention include 1,2,3-trichlorobenzene, 1,2,4-trichlorobenzene, hexachlorobenzene, 1,3,5-trichlorobenzene, 1,2,3,4-tetrachlorobenzene, 1,2,4,5-tetrachlorobenzene, 1,3,5-trichloro-2,4,6-trimethylbenzene, 2,4,6-trichlorotoluene, 1,2,3-trichloronaphthalene, 1,2,4-trichloronaphthalene, 1,2,3,4-tetrachloronaphthalene, 2,2',4,4'-tetrachlorobiphenyl, 2,2',4,4'-tetrachlorobenzophenone, 2,2',4-trichlorobenzophenone, analogous compounds thereof and mixtures thereof. Among these polyhaloaromatic compounds, 1,2,4-trihalobenzene and 1,3,5-trihalobenzene are preferable.

POLYMERIZATION SOLVENT

The organic amide solvent usable in the polymerization reaction of the present invention include N-methylpyrrolidone (NMP), N-ethylpyrrolidone, N,N-dimethylformamide, N,N-dimethylacetamide, N-methylcaprolactam, tetramethylurea, 1,3-dimethyl-2-imidazolidinone, hexamethylphosphoric triamide, analogous compound thereof and mixture thereof. Among these solvents, N-methylpyrrolidone and 1,3-dimethyl-2-imidazolidinone are especially preferable.

REACTOR

In the polymerization process of the present invention, it is quite preferable that all steps, especially a dehydration step which is usually performed before starting the polymerization reaction for adjusting the amount of water in the system, be conducted in a reactor of which at least a part contacting the reaction solution is composed of a titanium material for preventing decomposition of the solvent or polymer and contamination of the product by heavy metal salts.

In the present invention, since stirring is essential for the granulation of cross-linked PAS, the reactor should have a stirring device for rendering the reaction mixture into a stirred-up state during the reaction.

POLYMERIZATION

The polymerization reaction of the present invention is performed in at least two steps (A) and (C) which differ in amount of water existing in the system and in reaction temperature. The term "at least two steps" above means that an auxiliary step or steps may be inserted before, after or between said two steps as far as the effect of the present invention derived from the combination of the two steps (A) and (C) is realized.

It is also a feature of the present invention that during a course shifting from step (A) to step (C), temperature increasing rate is properly controlled so that the progress of polymerization to a high degree and the progress of granulation is to be balanced adequately.

INITIAL-STAGE POLYMERIZATION STEP (A)

In the initial-stage polymerization step (A) of the present invention, DHA and PHA reacts with alkali metal sulfide under an existence of 0.5 to 2.9 moles of water per mol of said alkali metal sulfide at the temperature of not lower than 180° C. to lower than 235° C. until a total conversion ratio of DHA and PHA reaches 50 to 98 mol % and the polymer obtained is a cross-linked PAS having a melt viscosity, ($\eta_1^*$), of 5 to 5,000 poise [hereinafter, ($\eta_1^*$) is a value measured at 310° C.

and a shearing rate of 1,200/second]. The polymerization reaction is performed by adding halogenated aromatic compounds and an alkali metal sulfide to an aromatic amide solvent and then increasing the reaction temperature to a predetermined value.

When the amount of water in the alkali metal sulfide is less than the prescribed amount, a necessary amount of water would be supplied. When the amount of water is too high, the surplus portion is to be taken out of the system by a method known in the art, for instance, by heating the solvent containing the alkali metal sulfide from 150° C. to around 210° C. before adding the halogenated aromatic compounds. The amount of water in the polymerization system should be in the range of 0.5 to 2.9 moles per mol of the fed alkali metal sulfide.

When the water content is less than 0.5 mol, an undesirable reaction such as decomposition of the product PAS takes place. On the other hand, when the water content exceeds 2.9 moles, an undesirable phenomenon such as big reduction of polymerization rate or generation of thiophenol due to a decomposition of the components in the system takes place.

The amount of water in the range of 1.0 to 2.4 moles per mol of the alkali metal sulfide is most preferable because it promotes the polymerization very smoothly. The amount of an organic amide solvent in the polymerization reaction is preferably in the range of 0.2 to 5 liters, more preferably 0.3 to 1 liter, per mol of alkali metal sulfide.

The mol ratio of the halogenated aromatic compounds to the alkali metal sulfide in the reaction is preferably in the range of 0.98 to 1.3 and more preferably 0.98 to 1.05.

When the ratio is less than 0.98 or exceeds 1.3, it becomes difficult to obtain cross-linked PAS having a high melt viscosity.

The amount of PHA used in the polymerization reaction in the present invention is preferably in the range of 0.003 to 0.1 mol per mol of the alkali metal sulfide. When the amount is less than 0.003 mol, it becomes very difficult to obtain cross-linked PAS having a high melt viscosity and on the other hand, when the amount exceeds 0.1 mol, granulation of the product is difficult because the product becomes too highly cross-linked. The most preferred amount of PHA is in the range of 0.005 to 0.05 mol per mol of the sulfide.

The initial-stage polymerization step is performed at a temperature in the range of 180° to 235° C. The too low temperature makes the reaction rate too slow and the temperature exceeding 235° C. is prone to cause decomposition of the produced cross-linked PAS and the solvent, making it impossible to obtain the cross-linked PAS having a high melt viscosity. The preferred temperature range is 200° to 225° C.

The end point of the initial-stage polymerization step (A) is the point when the total conversion of DHA and PHA in the system has reached 50 to 98 mol %. When the conversion is less than 50 mol %, undesirable reaction such as decomposition of the components takes place during second-stage polymerization step (C). On the other hand, when the conversion exceeds 98 mol %, the cross-linked PAS obtained after the second-stage polymerization step results in fine powders, not in granules which are easy to handle.

The most preferred conversion ratio is in the range of 85 to 95 mol %, since a stable reaction to obtain an adequately granulated cross-linked PAS having a high melt viscosity is possible within the range.

The conversion ratio (%) of halogenated aromatic compounds (hereinafter referred to as "HAC") in the present invention was calculated with either of the following equations.

(a) In case HAC is added in excess of an alkali metal sulfide, both in mol:

Conversion ratio (%) = [Amount of HAC fed (mol) − Amount of residual HAC (mol)]/[Amount of HAC fed (mol) − Amount of excess HAC (mol)] × 100

(b) In case other than (a):

Conversion ratio (%) = [Amount of HAC fed (mol) − Amount of residual HAC (mol)]/[Amount of HAC fed (mol)] × 100

In the above equations, the molar number of HAC was calculated on an assumption that all HAC had two halogen substituents in a molcule, taking into consideration the way of reaction between alkali metal sulfide and HAC. (Note: The assumption is only for the calculation of the conversion ratio). In this calculation method, 1 mol of dichlorobenzene corresponds to 1 mol of HAC, but 1 mol of trichlorobenzene corresponds to 1.5 moles of HAC and 1 mol of tetrachlorobenzene to 2 moles of HAC.

A melt viscosity of cross-linked PAS at the end of initial-stage polymerization step (A), ($\eta_1^*$) should be in the range of 5 to 5,000 poise and the range of 10 to 3,000 poise is especially preferable because this viscosity range gives adequately granulated cross-linked PAS of the present invention. When said melt viscosity, ($\eta_1^*$), is less than 5 poise, it is probable to occur an undesirable reaction such as decomposition of a reaction mixture in the polymerization system during the second-stage polymerization step (C). When said melt viscosity exceeds 5,000 poise, the adequate granulation will not take place during the second-stage polymerization step (C) and the cross-linked PAS produced is prone to be fine powders. Accordingly, both cases are not preferable.

In the polymerization, various kinds of salts referred to as polymerization aid or polymerization catalyst, such as carboxylic alkali metal salts, carboxylic alkaline earth metal salts, sulfonic alkali metal salts, lithium chloride, lithium carbonate or potassium fluoride, can be added with the limit not to damage the features of the present invention.

The effects which can be expected by the addition of said salts are (1) reduction of an amount of water to be exist in the second-stage polymerization step (C) and (2) reduction of reaction pressure.

TEMPERATURE RAISING STEP (B)

After the initial-stage polymerization step (A) is over, the water content in the system is adjusted to 2.5 to 7 moles per mol of fed alkali metal sulfide. In other word, when the amount of water exist in the initial-stage polymerization step is not enough to perform the succeeding step, the necessary amount of water is to be added. When the overall amount of water in the system is less than 2.5 moles or more than 7 moles per mol of an alkali metal sulfide, an adequate granulation of the final product of cross-linked PAS becomes impossible. The preferable range of water content is 2.7 to 6 moles since this range of water content makes it easy to obtain a highly cross-linked PAS being adequately granulated and becoming gel under melting.

The expression "becomes gel under melting" in the present invention means a situation in which when the highly cross-linked PAS of the present invention is heated to substantially the same level of temperature as a melting point of conventional PAS having a low degree of cross-linkage, there partially exist the polymer particles not perfectly melted and accordingly the whole polymer presents a gel-like state.

Control of the condition between the initial-stage polymerization step (A) and the second-stage polymerization step (C) is an important factor in practicing the present invention.

The present inventors studies the change in the course of step (A) to step (C) quite in detail and have found the followings:

(1) During the course when the reaction temperature is raised to the predetermined temperature of the second-stage polymerization step (C) after adjusting an amount of water as prescribed for step (C) at the end of step (A), agglomeration and growing of phase-separated polymer particles start and simultaneously to the growing of the particles, melt viscosity of the polymer increases rapidly;

(2) The agglomeration and growth of the polymer particles start at around 240° C. and become active along with the temperature increase; and (3) An excess agglomeration of the particles to undesirable size occurs at the temperature higher than around 240° C., too.

Therefore, in order to obtain cross-linked PAS having a desirable size of granules and being easy to handle, it is necessary to perform the granulation by adequately controlling agglomeration and growth of the particles at the temperatures higher than around 240° C. and substantially stop excess agglomeration when the polymer particles reach the desirable size.

As a result of further studies more in detail, the present inventors found that, for obtaining cross-linked PAS having the desirable size of granules, it is necessary to satisfy the following two conditions:

(1) In the course of temperature raising, a melt viscosity of the polymer obtained at 240° C., at which temperature agglomeration and growth of polymer particles starts to be active, $(\eta_2^*)$, is in the range of 300 to 10,000 poise [hereinafter, the melt viscosity value, $(\eta_2^*)$, is the one measured at 310° C. and a shear rate of 1,200/second].

(2) In the step of temperature raising, the rate of raising is in the range of 10° to 100° C./hour at the temperature of not less than 240° C.

Accordingly, after the initial-stage polymerization step (A) is over, water content is adjusted and heating is conducted so that produced polymer will have the prescribed value of melt viscosity, $(\eta_2^*)$.

When the melt viscosity, $(\eta_2^*)$, is below 300 poise, excess agglomerations of polymer particles take place during temperature raising to higher than 240° C. When said melt viscosity is over 10,000 poise, further growth of polymer particles is impossible no matter how the temperature raising rate is changed within the practical range and the obtained cross-linked PAS is fine powders which are troublesome to handle. The preferred range of melt viscosity, $(\eta_2^*)$, is 700 to 5,000 poise.

In the method of the present invention, a sharp rise of melt viscosity starts at around 240° C. during the shifting from initial-stage polymerization step to second-stage polymerization step. Therefore, when the temperature raising rate from around 240° C. and thereafter is as slow as less than 10° C./hour, the polymerization reaction proceeds and the melt viscosity of the polymer become high before the particles of the phase separated polymer grow in an adequate size and as a result fusing and growth of the cross-linked PAS never occur and only fine powders of the polymer can be obtained. On the other hand, when the increasing rate from around 240° C. and thereafter is as fast as more than 100° C./hour, growth of particles advances before the viscosity is increased, resulting in excess agglomeration of cross-linked PAS particles. Accordingly, the both cases are not preferable.

The temperature raising rate at 240° C. and thereafter in the range of 10° to 100° C./hour is essential, 20° to 70° C./hour is preferable and 30° to 60° C./hour is more preferable.

The temperature raising step (B) is a step for raising the temperature of 180° to 235° C. in the initial-stage polymerization step (A) to a temperature of 245° to 290° C. in the second-stage polymerization step (C) and for this step (B), any heating method can be used as far as the above conditions (1) [$(\eta_2^*)$] and (2) [temperature raising rate], are satisfied. For example, temperature can be lowered temporarily to adjust water content of the system.

Progress of the granulation in this step can be estimated by a change of stirring power. When the change of stirring power indicated by input power (KW) per unit volume of slurry with constant r.p.m. of the stirrer is checked, a sharp change of stirring power can be seen between around 240° C. and around 250° C. of the internal temperature.

SECOND-STAGE POLYMERIZATION STEP (C)

In the step (C), the polymerization reaction is continued at 245° to 290° C. in the presence of water of an amount adjusted in the step (B), namely 2.5 to 7 moles per mol of the fed alkali metal sulfide. When the polymerization temperature is lower than 245° C., it is likely that the final product can not be granulated adequately. On the other hand, when the temperature exceeds 290° C., the produced cross-linked PAS or polymerization solvent is likely to be decomposed. Polymerization temperature of this step is preferable in the range of 250° to 270° C. Polymerization time for this step is 0.5 to 20 hours, and in most cases, 1 to 10 hours will be enough.

As explained above, according to the method of the present invention, it is supposed that granulation of the polymer starts at around 240° C. and is almost substantially completed in the course of raising temperature to that of the second-stage polymerization step, namely during step (B). However, growth of particle size occurs to some extent in the second-stage polymerization step, too. It is therefore necessary that the melt viscosity of the final polymer, $(\eta_3^*)$, is increased to an extent not to cause any excess growth of particles in the second-stage polymerization step. Accordingly, proper selection of starting materials and polymerization conditions is important and the selection should be made to make the melt viscosity of the finally obtained polymer, $(\eta_3^*)$, not less than $1 \times 10^5$ poise. The preferable range of the viscosity is not less than $5 \times 10^5$ poise [hereinafter, the melt viscosity value, $(\eta_3^*)$, is the one measured at 330° C. and a shear rate of 2/second].

In the foregoing descriptions about the polymer particles, the expression "granulated polymer particles which are easy to handle" means polymer particles having an average particle diameter of 100 to 2,000 μm, preferably 200 to 1,000 μm, more preferably 300 to 800 μm and the expression "fine powdery polymer which is troublesome to handle" means a polymer having an average particle size of less than 100 μm.

AFTER-TREATMENT

After-treatment in the polymerization process of the present invention can be done by known methods. For instance, after completion of the second-stage polymerization reaction the reaction mixture (slurry) is filtered without dilution or after diluting with a diluent, such as water, alcohol, hydrocarbon solvent, and the filtered polymer is washed with water, dehydrated and dried to obtain a cross-linked PAS.

If necessary, cake of the polymer can be washed with an organic solvent such as alcohol, acetone, after the filtration of the slurry or after the washing with water, or the product can be immersed in an aqueous solution of a strong acid having a pH value of below 2 or 0.1 to 30 wt % aqueous solution of a salt of a strong acid and a weak base as proposed in our Japanese Patent Application, Laid-Open (KOKAI) No. 62-4872.

CROSS-LINKED PAS OBTAINED

The cross-linked PAS obtained according to the present invention is a granular polymer excellent in free-flowing, having a melt viscosity, ($\eta_3^*$), of not lower than $1 \times 10^5$ poise, an average particle diameter in the range of 100 to 2,000 μm and a bulk density of not less than 0.25 g/ml.

By the present invention, it has become possible to industrially produce cross-linked PAS with excellent handling qualities and a high melt viscosity in commercial plants.

The term "cross-linked PAS with excellent handling qualities" means;

(1) when a slurry of the PAS is discharged from a polymerizer, it is easy to transport and separate from water; and (2) since the dried granulated PAS is excellent in free-flowing and hardly lumps, (a) it is easy to transport as it is, to put into bags and to keep in storage, and (b) in a melt molding process, it does not flock in a hopper and is good in being supplied to a machine.

In the present invention, polymerization reaction of PAS is performed in two stages as disclosed in U.S. Pat. No. 4,645,826 and heating is made so that melt viscosity, ($\eta_2^*$), of the obtained polymer at 240° C. becomes 300 to 10,000 poise. In addition, temperature raising step (B), in which a temperature is raised to 240° C. so as to make a melt viscosity of the polymer obtained at 240° C., ($\eta_2^*$), become 300 to 10,000 poise and further raising temperature at the rate of 10° to 100° C./hour thereafter, is inserted between initial-stage polymerization step (A) and second-stage polymerization step (C). By this novel method, temperature raising rate can be controlled adequately while balancing a progresses of the polymerization and the granulation. As a result, it becomes possible to produce a highly cross-linked PAS, becoming gel under melting, which has been impossible, so far, to produce in a granular form. Because of its granular form, the highly cross-linked PAS of the present invention is excellent in handling as described above.

The fact that the cross-linked PAS having high melt viscosity produced by the process of the present invention becomes gel under melting, clearly suggests that the PAS is cross-linked three dimensionally.

PAS of the present invention can be used alone as a sintered porous body, for example, as a filter having an excellent corrosion-resistance and heat-resistance and further it can be added to a conventional PAS composition for use, for instance, as an anti-flash agent in an injection molding, weld strength modifier, polymer reforming agent such as crystallization degree improver for injection molded products and the like as disclosed in Japanese Patent Application Laid-Open (KOKAI) No. 63-75,369.

The present invention will hereinafter be explained with reference to the following Examples, which however, are not to be construed as limiting the scope of the present invention.

EXAMPLE 1

1,100 kg of N-methyl-2-pyrrolidone (hereinafter referred to as "NMP") and 372.7 kg of hydrous sodium sulfide (purity: 46.07% by weight) were supplied into a titanium-lined polymerizer and heated to around 202° C. to distill out 140 kg of water. (1.5 moles of water per mol of alkali metal sulfide).

318.5 kg of p-dichlorobenzene and 5.792 kg of 1,2,4-trichlorobenzene were further supplied into the polymerizer, polymerized at 220° C. for 5 hours and completed the initial-stage polymerization.

Then 97 kg of water was added (internal temperature of the polymerizer has dropped to around 200° C.), the mixture was heated to 255° C. at a rate of about 40° C./hour and further polymerized at the temperature for 5 hours. The amount of water present in the system was 4 moles per mol of alkali metal sulfide.

The resulting slurry containing the polymer was passed through a screen having approximately 0.1 mm openings and separated the particulate polymer only. The obtained polymer was washed with acetone and then with water to obtain a washed polymer.

The washed polymer was immersed in a 2% aqueous solution of NH$_4$Cl at 40° C. for 30 minutes, washed with water and fluidizedly dried at 110° C. for 3 hours.

Yield of the granular polymer was 85%. Melt viscosity, ($\eta_3^*$), melt index and average particle diameter of the obtained cross-linked polymer were measured and shown in Table 1. Samples of the polymer were taken at several stages during the polymerization reaction to study progress of the polymerization. Namely, portions of slurry were taken out from the polymerizer at the end of the initial-stage polymerization (220° C., 5 hours), immediately after the addition of water and when the temperature reached 240° C. during the temperature raising step and the conversion ratio of HAC, melt viscosity, melt flow rate of the polymer in the samples were measured and the results are also shown in Table 1. These measurement were made according to the measuring method described below.

The slurry taken at the time when the granulation of polymer is still insufficient, was filtered by suction to remove a liquid portion, washed with water to remove inorganic salts and dried at 80° C. for 12 hours under reduced pressure.

MEASURING METHOD (1) Conversion ratio of HAC

For the calculation of the ratio with the equations described in page 10 of the present specification, residual amounts of DHA and PHA are determined by gas chromatography.

(2) Melt viscosity

Test pieces for a melt viscosity was prepared by pressing a sample polymer to a sheet at 320° C. for 30 to 60 seconds and the sheet was cut into small pieces.

The melt viscosity was measured with Capirograph manufactured by TOYO SEIKI Co.

(3) Melt flow rate

A melt flow rate was measured according to the method of ASTM-D 1238-70 at 315° C. and with a loading of 5 kg. The value is shown in g/10 minutes.

TABLE 1

| Sample | Conversion Ratio of HAC (%) | Melt Viscosity (poise) | Melt Flow Rate (g/10 minutes) | Average Particle Diameter (μm) |
|---|---|---|---|---|
| Taken at the end of initial-stage polymerization | 94.5 | 100 | 4,328 | <50 |
| Taken immediately after the addition of water | — | 250 | 1,443 | <100 |
| Taken at the point when the temperature reached 240° C. | 95.3 | 1,800 | 114 | <100*2) |
| Final Product | 99.8 | 1.5 × 10$^7$ | <<1*1) | 425 |

Note:
*1)The value was almost 0.
*2)Coarse particles greater then 100 μm in diameter are also present.

EXAMPLE 2

6,000 g of NMP and 3,200 g of hydrous sodium sulfide (purity: 46.00% by weight) were supplied into a titanium-lined 20-liter autoclave and heated to 200° C. to distill out 1,394 g of water, 1,166 g of NMP and 12.8 g of hydrogen sulfide. Then, 179 g of water, 4,409 g of NMP, 2,736 g of p-dichlorobenzene and 51.83 g of 1,2,4-trichlorobenzene were supplied to the autoclave and the mixture was heated to 220° C. and reacted for 5 hours. ($C_6H_4Cl_2/Na_2S=1.0067$; $C_6H_3Cl_3/Na_2S=0.0154$; and $H_2O/Na_2S=1.5$. All in mol ratios).

832 g of water was further added ($H_2O/Na_2S=4.0$ in mol ratio) and the mixture was heated to 255° C. at an average temperature raising rate of 35° C./hour and reacted at the temperature for 5 hours.

After the reaction mixture was cooled, the slurry containing the produced polymer was passed through a screen having approximately 0.1 mm openings to separate the granular polymer only and the polymer was washed with acetone then with water.

The washed polymer was immersed in a 2% aqueous solution of $NH_4Cl$ at 40° C. for 30 minutes, washed with water and dried at 110° C. for 3 hours.

The obtained polymer had an average particle diameter of 760 μm and a melt viscosity, ($\eta_3^*$), of $1.3 \times 10^7$ poise.

As in Example 1, samples were taken at certain points of polymerization to study a progress of the polymerization. The conversion ratio and the melt viscosity, ($\eta_1^*$), at the end of initial-stage polymerization were 95.0% and 150 poise, respectively and the melt viscosity, ($\eta_2^*$), was 1,700 poise when the temperature reached 240° C.

EXAMPLE 3

Polymerization was performed in the same procedure as Example 2 except that the initial-stage polymerization was performed at 220° C. for 10 hours and the temperature raising rate between initial-stage and second-stage polymerizations was about 70° C./hour. The granular polymer obtained had an average particle diameter of 550 μm and a melt viscosity, ($\eta_3^*$), of $1.1 \times 10^7$ poise.

During the polymerization, the conversion ratio and the melt viscosity, ($\eta_1^*$), at the end of initial-stage polymerization were 97.1% and 2,240 poise, respectively and the melt viscosity, ($\eta_2^*$), was 5,800 poise when the temperature reached 240° C.

EXAMPLE 4

The polymerization was performed in the same concept as in Example 2, namely:

900 g of NMP and 480 g of hydrous sodium sulfide (purity: 46.00% by weight) were supplied into a titanium-lined 3-liter autoclave and heated to 200° C. to distill out 220 g of water, 182 g of NMP and 1.9 g of hydrogen sulfide. Then 38 g of water, 668 g of NMP, 410 g of p-dichlorobenzene and 3.95 g of 1,2,4-trichlorobenzene were supplied to the autoclave and the mixture was heated to 220° C. for 15 hours. Then, the reaction mixture was heated to 255° C. at an average temperature raising rate of 45° C./hour and reacted at the temperature for 5 hours.

The remaining process was performed as in Example 2 and obtained a granular cross-linked PAS. The granular cross-linked PAS obtained had an average particle diameter of 780 μm and a melt viscosity, ($\eta_3^*$), of $7.7 \times 10^5$ poise.

The conversion ratio and the melt viscosity, ($\eta_1^*$), at the end of initialstage polymerization were 97.8% and 560 poise, respectively and the melt viscosity, ($\eta_2^*$), was 720 poise when the temperature reached 240° C.

EXAMPLE 5

220.6 g of hydrous sodium sulfide (purity: 46.2% by weight) and 1,000 g of NMP were supplied into a 3-liter autoclave and heated to 200° C. under stirring in a nitrogen atmosphere to distill out 83.3 g of water, 84.4 g of NMP and 0.11 mol of hydrogen sulfide.

191.0 g of p-dichlorobenzene, 4.1 g of 1,2,4-trichlorobenzene, 25.6 g of water and 378.8 g of NMP were added and the mixture was heated to 220° C. under stirring in a nitrogen atmosphere and reacted for 10 hours to complete initial-stage polymerization. (The amount of water present in the system was about 2.8 moles per mol of sodium sulfide).

Subsequently, 32.7 g of water was pumped into the autoclave and after further replacing the atmosphere with nitrogen, the mixture was heated to 255° C. at a raising rate of about 26° C./hour and reacted for additional three hours.

The reaction product was slightly grayish granules having an average diameter of about 600 μm and a melt viscosity, ($\eta_3^*$), of $0.98 \times 10^7$ poise.

The conversion ratio and the melt viscosity, ($\eta_1^*$), at the end of initialstage polymerization were 96% and 30 poise, respectively and the melt viscosity, ($\eta_2^*$), was 1,550 poise when the temperature reached 240° C.

COMPARATIVE EXAMPLE 1

The polymerization was performed in the same manner as in Example 2 except that the initial-stage polymerization was conducted at 220° C. for 3 hours and the average temperature raising rate was 40° C./hour. The experiment was suspended on the way since the produced polymer particles began to agglomerate excessively when the temperature reached around 245° C. in the course of temperature raising.

In the course of polymerization operation, the conversion ratio and the melt viscosity, ($\eta_1^*$), at the end of initial-stage polymerization were 88% and less than 5 poise, respectively and the melt viscosity, ($\eta_2^*$), was 56 poise when the temperature reached 240° C.

What is claimed is:

1. A process to produce a cross-linked granular polyarylene sulfide by reacting an alkali metal sulfide, a dihaloaromatic compound and a polyhaloaromatic compound in an organic amide solvent, comprising:

(A) an initial-stage polymerization step for obtaining a polyarylene sulfide by reacting an alkali metal sulfide, a mixture of dihaloaromatic and polyhaloaromatic compounds in an amount of 0.98 to 1.3 mol containing 0.003 to 0.1 mol polyhaloaromatic compound having three or more halogen substituents in a molecule, per mol of the alkali metal sulfide, in the presence of water in an amount of 0.5 to 2.9 moles per mol of said alkali metal sulfide at a temperature not lower than 180° C. to lower than 235° C. until a total conversion ratio of said dihalo- and polyhaloaromatic compounds reaches 50 to 98% and a melt viscosity of a polyarylene sulfide obtained at the end of the step becomes 5 to 5,000 poise, measured at 310° C. and a shear rate of 1,200/second;

(B) a temperature raising step in which with the amount of water adjusted to 2.5 to 7 moles per mole of fed alkali metal sulfide, the temperature raising condition from the temperature of step (A) to 240° C. is controlled so that the melt viscosity of a polymer obtained at 240° C. reaches in the range of 300 to 10,000 poise, measured at 310° C. and a shear rate of 1,200/second and the temperature raising rate between 240° C. and a temperature of the following step (C) is further controlled to be within the range of 10° to 100° C./hour; and (C) a second-stage polymerization step for further continuing the reaction at a temperature of 245° to 290° C. until a melt viscosity of the final product reaches not lower than $1 \times 10^5$ poise, measured at 330° C. and a shear rate of 2/second and wherein the average particle diameter of the granular cross-linked polyarylene sulfide obtained is 100 to 2,000 μm.

2. The process according to claim 1, wherein in the step (B) said melt viscosity of a polymer obtained at 240° C. is 700 to 5,000 poise.

3. The process according to claim 1, wherein in the step (B) said temperature raising rate is within the range of 20° to 70° C./hour.

4. The process according to claim 1, wherein in step (C), the amount of water at the second stage of polymerization is adjusted to within the range of 2.5 to 7 mols per mol of fed alkali metal sulfide.

* * * * *